H. PIERCE.

MUSIC SHEET.

APPLICATION FILED JUNE 24, 1910.

Reissued Aug. 27, 1912. 13,464.

Witnesses
Chas. Warnick
A. Lydia Jones

Inventor
Harry Pierce
by A. Miller Belfield
Atty

UNITED STATES PATENT OFFICE.

HARRY PIERCE, OF KANSAS CITY, MISSOURI, ASSIGNOR, BY MESNE ASSIGNMENTS, TO THE CABLE COMPANY, OF CHICAGO, ILLINOIS, A CORPORATION OF ILLINOIS.

MUSIC-SHEET.

13,464. Specification of Reissued Letters Patent. Reissued Aug. 27, 1912.

Original No. 899,470, dated September 22, 1908, Serial No. 391,659. Application for reissue filed June 24, 1910. Serial No. 568,819.

*To all whom it may concern:*

Be it known that I, HARRY PIERCE, a citizen of the United States, residing at Kansas City, in the county of Jackson and State of Missouri, have invented certain new and useful Improvements in Music-Sheets, of which the following is a specification.

This invention has for its object a specially devised perforated music sheet for pneumatically actuated musical instruments, and is especially designed for use with my improved tracker board and valve system for instruments of this character as set forth in a companion application of even date herewith, Serial No. 391,658.

For a full understanding of the invention and the merits thereof and also to acquire a knowledge of the details of construction and the means for effecting the results, reference is to be had to the following description and accompanying drawings, in which:—

Figure 1:
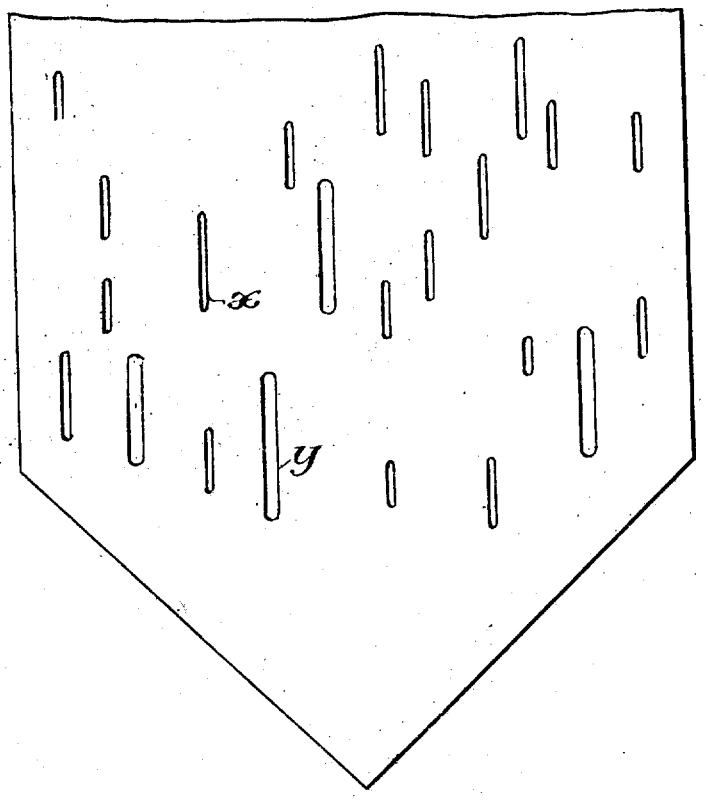
Figure 2:
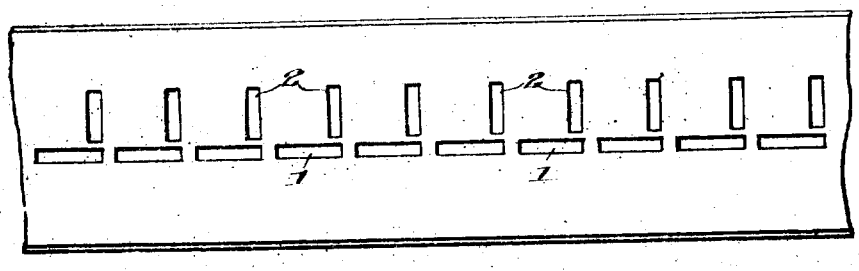

Figure 1 represents a portion of a music sheet formed in accordance with my invention; and Fig. 2 illustrates the tracker board with which the said sheet is intended to be used.

Corresponding and like parts are referred to in the following description and indicated in all the views of the drawings by the same reference characters.

In accordance with my invention it is proposed to emphasize the theme or melody of a composition by a specially devised pneumatic valve system depending for its operation upon the opening at the same time of any two or more complementary air passages in a tracker board that is formed with two sets of such passages. One set designated 1 (Fig. 2) is connected to the ordinary double action vacuum chests and the other set 2 is connected to an additional vacuum chest for a full description of which reference may be had to my other application, above mentioned. The respective passages 1 and 2 extend at right angles to each other, as best seen in Fig. 2, the passages 1 being longitudinally elongated and the passages 2 transversely elongated and set back of the respective passages 1 in alinement with one end thereof.

The sheet, as shown in Fig. 1, is formed with slots $x$ for use with the ordinary passages 1 and with other and wider slots $y$ for use in accentuating any particular note or notes.

In practical operation whenever a slot the size of the slot $y$ passes over the tracker board, it will strike one of the passages 2 as well as the passage 1 just in front of said passage 2, thereby bringing into effect my additional vacuum chest as well as the ordinary vacuum chests and thereby increasing the suction and accentuating the desired note.

The slots $y$ are for the notes that carry the melody and the slots $x$ are for the notes which are more subdued, for it will be understood that the slots $x$ in passing over the tracker board do not register with the passages 2 at all.

Having thus described the invention, what is claimed as new is:

1. The combination with a perforated music sheet having two sets of openings therein, of a tracker board having two sets of air passages, the passages of one set being arranged back of corresponding passages in the other set and in transverse alinement with the ends thereof, each opening of one set of openings in the music sheet being of a length greater than the distance between corresponding passages of both sets whereby to simultaneously open corresponding passages of both sets of passages in the tracker board.

2. The combination with a perforated music sheet formed with two sets of openings, of a tracker board having two sets of air passages, one set being longitudinally elongated, and the other set being transversely elongated, and in transverse alinement with the ends of the longitudinally elongated passages, respectively, one set of the openings in the music sheet being in alinement with the longitudinally elongated passages only, and the other set of openings in the music sheet being in alinement with the other set of passages in the tracker board and of a width to simultaneously uncover only one of such passages, and an end portion of a longitudinally elongated passage.

3. The combination of a tracker having forward and rear apertures arranged in groups with a forward and a rear aperture in each group, the apertures of each group being wholly out of alinement with the apertures of adjacent groups, and a music sheet having perforations some of which are adapted to open both apertures of a group and others of which are out of alinement with one aperture of a group and adapted to open the other aperture of said group.

4. A music sheet having wide and narrow perforations in combination with a tracker board having front and rear apertures partly in alinement and partly out of alinement with one another, the wide perforations of the music sheet being adapted to open alining apertures of the tracker, and the narrow perforations being adapted to open portions of said apertures not in alinement with one another.

5. The combination with a perforated music sheet having two sets of openings therein, of a tracker board having two sets of air ports, the ports of one set being arranged back of corresponding ports in the other set, and in transverse alinement with the ends thereof, each opening of one set of openings in the music sheet being of a length greater than the distance between corresponding ports of both sets, whereby to simultaneously open corresponding ports of both sets of ports in the tracker board.

6. The combination with a perforated music sheet formed with two sets of openings, of a tracker board having two sets of air ports, one set being longitudinally elongated, and the other set being transversely elongated and in transverse alinement with the ends of the longitudinally elongated ports, respectively, one set of openings in the music sheet being in alinement with the longitudinally elongated ports only, and the other set of openings in the music sheet being in alinement with the other set of ports in the tracker board and of a width to simultaneously uncover only one of said ports, and an end portion of a longitudinally elongated port.

7. The combination of a tracker having longitudinally elongated front ports and transversely elongated rear ports, and a music sheet having perforations adapted to open a front port only, and other perforations adapted to open a front and associated rear port, so that the two shall be simultaneously open.

8. The combination of a tracker having longitudinally elongated front ports and transversely elongated rear ports, each rear port being located at one end of a front port, and a music sheet having perforations adapted to open a front port only and other perforations adapted to open a rear port and then a front port.

9. The combination of a tracker having front and rear apertures arranged in groups, with a front and a rear aperture in each group, of a music sheet having perforations adapted to open a front port only of a group and other perforations adapted to open a rear port of a group and subsequently a front port thereof.

10. The combination of a tracker having groups of ports with a front and rear port in each group and a music sheet having perforations, some of which are adapted to open the front ports only of groups, and others of which are adapted to open the rear ports of groups and subsequently the corresponding front ports, holding the rear ports open until the corresponding front ports are opened.

In witness whereof I hereunto subscribe my name this 16th day of June, 1910.

HARRY PIERCE.

Witnesses:
G. H. STUBENBERG,
E. K. CORBETT.